United States Patent [19]

Fauske

[11] Patent Number: 4,923,306

[45] Date of Patent: May 8, 1990

[54] STABLE ISOTHERMAL CALORIMETER

[75] Inventor: Hans K. Fauske, Hinsdale, Ill.

[73] Assignee: Westinghouse Electric Corp., Pittsburgh, Pa.

[21] Appl. No.: 391,622

[22] Filed: Aug. 3, 1989

Related U.S. Application Data

[63] Continuation of Ser. No. 1,302, Jan. 8, 1987, abandoned.

[51] Int. Cl.[5] .................... G01N 25/48; G01K 17/02
[52] U.S. Cl. ........................................ 374/34; 374/33;
374/54; 165/11.1
[58] Field of Search ...................... 374/31, 33, 34, 54;
436/147; 422/51; 165/11.1, 104.21, 104.27

[56] References Cited

U.S. PATENT DOCUMENTS

| | | | |
|---|---|---|---|
| 1,247,998 | 11/1917 | Parr | 374/34 |
| 1,607,684 | 11/1926 | Morehead | 374/36 |
| 3,593,577 | 7/1971 | Monner | 374/34 |
| 3,665,761 | 5/1972 | Gregory | 374/31 |
| 3,841,155 | 10/1974 | Koehler et al. | 374/33 |
| 3,994,164 | 11/1976 | Regenass et al. | 374/31 |
| 4,130,016 | 12/1978 | Walker | 374/34 |
| 4,212,817 | 7/1980 | Schmid et al. | 165/11.1 |
| 4,511,263 | 4/1985 | Prosen | 374/38 |

FOREIGN PATENT DOCUMENTS 583444 1/1925 France .................. 374/54

*Primary Examiner*—William A. Cuchlinski, Jr.
*Assistant Examiner*—W. Morris Worth

[57] ABSTRACT

A stable isothermal calorimeter wherein the material under study is contained in a thermally conductive reactor vessel which is surrounded by a heat transfer fluid. The material is maintained at the boiling point of the heat transfer fluid which is in turn cntrolled by controlling the pressure of the fluid's vapor space. The heat transfer fluid is vaporized by the heat released by exothermal reaction of the material under study and the vaporized fluid condensed in a condenser. The rate of liquid accumulation in the condenser is proportional to the energy release rate of the material.

8 Claims, 1 Drawing Sheet

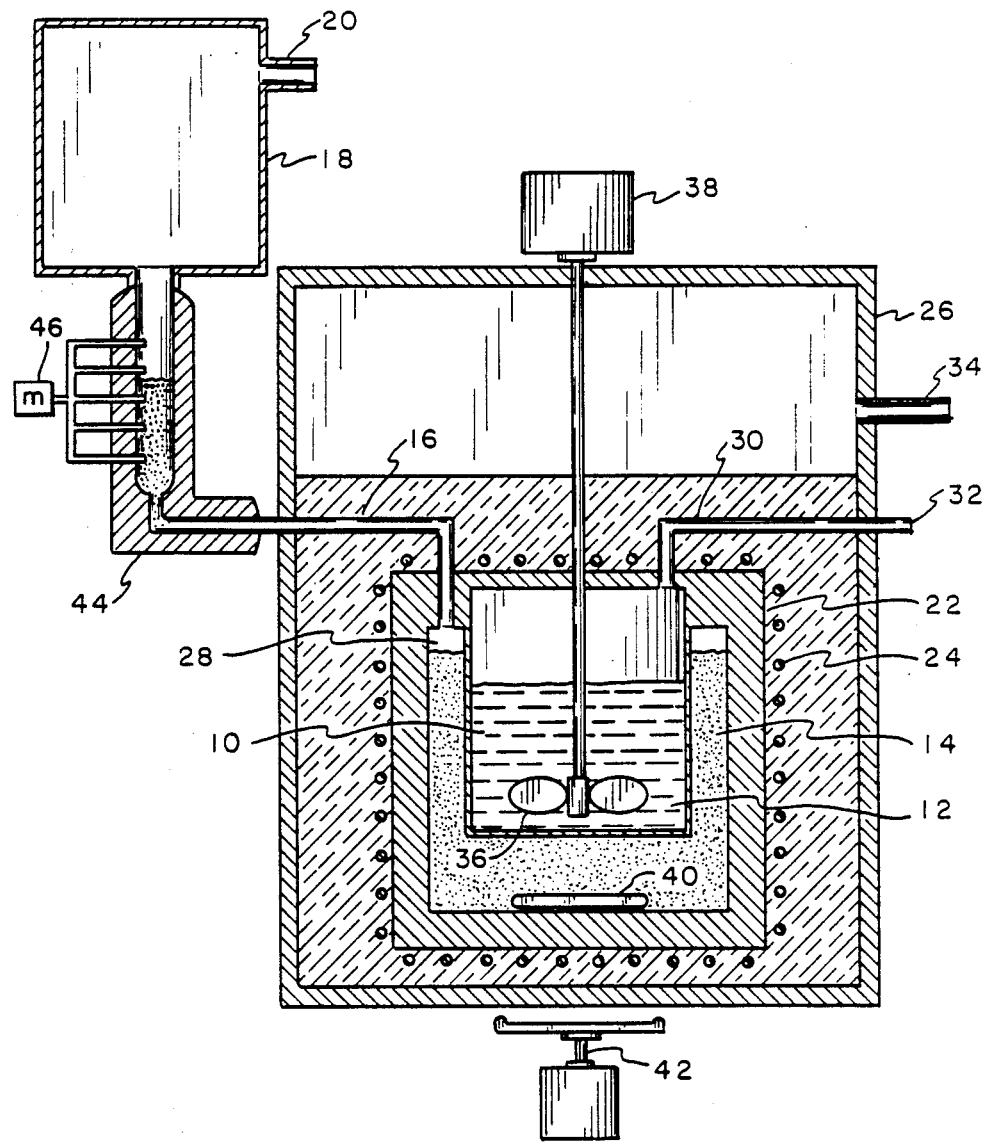

STABLE ISOTHERMAL CALORIMETER

This application is a continuation of application Ser. No. 07/001,302 filed Jan. 8, 1987, now abandoned.

BACKGROUND OF THE INVENTION

1. Field of the Invention

The present invention relates generally to the field of heat measuring apparatus and more particularly to an improved isothermal boiling calorimeter.

2. Description of the Prior Art

The conventional calorimeter is a well known device for measuring the heats of various physical and chemical processes. Since the heat released by an exothermic reaction may vary dramatically with the temperature at which the reaction takes place, it is necessary that a precise temperature be maintained. Prior isothermal calorimeters have involved elaborate and expensive measures to prevent heat exchange between the reactor vessel and the surroundings and typically have been inadequate to handle the high energy release rates encountered in chemical hazard research.

SUMMARY OF THE INVENTION

A thermally conductive reactor is disposed in an isothermal boiling jacket containing a heat transfer fluid. An exothermic reaction is maintained at the boiling temperature of the heat transfer fluid and the rate of energy release is determined by measuring the rate at which the heat transfer fluid is vaporized.

BRIEF DESCRIPTION OF THE DRAWING

The single appended drawing is a vertical cross-section schematic view of a preferred emodiment of the present invention.

DESCRIPTION OF PREFERRED EMBODIMENTS

With reference now to the FIGURE there is illustrated in schematic vertical cross-section an isothermal boiling calorimeter in accordance with the principles of the present invention. A reactor vessel 10 containing a sample 12 to be studied is disposed in an isothermal boiling jacket 14 containing a heat transfer fluid having a boiling point which is a known function of pressure. The isothermal boiling jacket 14 is in communication via tube 16 with a pressure vessel 18 whereby the pressure of the heat transfer fluid vapor space is controlled through an exhaust/supply port 20. The isothermal boiling jacket 14 and reactor vessel 10 are surrounded by a layer of insulation 22. A guard heater 24 is provided in order that heat losses from the isothermal boiling jacket 14 are kept to a minimum. The reactor vessel assembly is disposed in a high pressure containment vessel 26. The reactor vessel 10 is in communication via tube 30 with a fill/bypass/pressure port 32 externally of the containment vessel 26 which permits remote loading and feeding. The containment vessel 26 is also provided with a pressure supply/exhaust port 34.

A mechanical mixer 36 driven by motor 38 may be provided to assure a complete reaction of the sample 12 under study. The heat transfer fluid in the isothermal boiling jacket 14 is maintained at a uniform temperature by means of a magnetic stirring bar 40 which is driven by a magnetic stirrer assembly 42 which is known in the art.

As heat is released from an exothermic reaction in the reactor vessel 10 it is transferred to the fluid in the isothermal boiling jacket 14 causing a portion of the fluid to vaporize. The vapor passes through tube 16 to a condenser 44 which is provided with a liquid level sensor 46. The condenser 44 may be any type of high heat capacity arrangement compatible with the amount of heat to be released by the reaction in the reactor vessel 10. Illustrative examples would include a block of high heat capacity metal such as copper or a copper tube surrounded by an ice bath. Vaporized heat transfer fluid condenses to liquid in the condenser 44 and is measured by the liquid level sensor 46. The rate of liquid accumulation in the condenser 44 is directly proportional to the rate of energy release by the reaction in the reactor vessel 10. The volume of heat transfer fluid relative to the volume of reactants will vary with the reaction under study but will generally be at least 2:1 to ensure extraction of substantially all the energy generated by the reaction.

The sample 12 under study is thus maintained at the boiling point of the heat transfer fluid in the isothermal boiling jacket 14 thereby permitting study of the reaction under isothermal conditions. The boiling point of the heat transfer fluid is related to the pressure of its vapor space which is controlled by applying or releasing pressure to the pressure vessel 18 through exhaust/supply port 20. Thus by regulating the back pressure at the condenser 44 the reaction in the reactor vessel 10 may be studied under various controlled isothermal conditions.

The apparatus of the present invention permits the study of exothermic chemical reactions under stable temperature conditions which may be easily varied by adjusting the pressure of the heat transfer fluid vapor space. In actual practice it has been found that the above-described arrangement can maintain proper sample temperature for reactions with very high energy release rates within tolerances which are much closer than those achievable with conventional calorimeters.

From the preceeding description it will be seen that the applicant has provided a new and improved apparatus for studying energetic reactions under isothermal conditions. Since certain changes in the above-described construction will occur to those skilled in the art without departure from the scope of the invention it is intended that all material set forth in the description or shown in the appended drawing shall be interpreted as illustrative and not in a limiting sense. Having described what is new and novel and desired to secure by Letters Patent,

What is claimed is:

1. An apparatus for making measurements used to calculate the energy release rate at various temperatures of an exothermic reaction undergone by reactants under study, said apparatus comprising, in combination, a reactor vessel for containing a quantity of reactants to be studied, a boiling liquid jacket surrounding said reactor vessel and being in intimate heat exchange relation therewith, means permitting introduction of reactants into, and removal of reactants from, said vessel without removing said reactor vessel from said boiling liquid jacket said jacket containing a quantity of a heat transfer liquid, said liquid having a boiling point which varies in a known manner in relation to variations in pressure, said liquid subdividing said jacket into a subsurface portion and a headspace portion, means for controlling vapor pessure in said headspace portion, a condenser unit having an inlet portion, an outlet portion, and a liquid accumulation area between said inlet portion and said outlet portion, means providing an open path of communication between said condenser inlet portion and said headspace portion above said heat transfer liquid, and means providing an open path of communication between said condenser outlet portion and said means for controlling said vapor pressure in said headspace, means associated with said condenser for permitting observation of the volume of liquid condensed in said condenser accumulation area, means for maintaining said heat transfer liquid at a uniform temperature, and means for minimizing heat losses from said boiling liquid jacket, whereby, when said reactants undergo said exothermic reaction at a given temperature, the heat released by said reaction is used in evaporating a quantity of said heat transfer liquid, and whereby observing the rate of liquid accumulation in said condenser liquid accumulation area the energy release rate of said reactor contents at said given temperature may be ascertained, and whereby observing said liquid volume changes after varying the boiling point of said heat transfer liquid permits a determination of the variation of said energy release rate of said reactants at various temperatures.

2. An apparatus as defined in claim 1 which further includes a layer of heat insulation, surrounding said boiling liquid jacket and wherein said means for minimizing heat losses from said boiling liquid jacket comprises at least one heating element disposed within said insulation.

3. An apparatus as defined in claim 2 wherein said heating element is also surrounded by said layer of heat insulation.

4. An apparatus as defined in claim 1 which further includes a protective containment vessel surrounding said reactor vessel, said boiling liquid jacket, and said heating element with said containment vessel including at least one opening to permit passage of said means providing said open path of communication between said headspace portion and said condenser inlet portion and, with said condenser and said vapor pressure control means being disposed outside said protective containment vessel.

5. An apparatus as defined in claim 1 wherein said means maintaining said liquid at a uniform temperature includes a magnetically responsive stirring element disposed within a portion of said boiling liquid jacket and a magnetic stirring element drive unit disposed outside said apparatus, whereby operation of said stirring element drive unit causes agitation of said boiling fluid within said jacket.

6. An apparatus as defined in claim 1 which further includes an agitator motor disposed outside said reactor vessel, an agitator element disposed within said reactor vessel, a drive shaft extending between said motor and said element and having one of its ends secured to said agitator element, and the other of its ends secured to a rotary part of said motor.

7. An apparatus as defined in claim 1 wherein said means for controlling said vapor pressure in said headspace portion includes a pressure chamber having an inlet/outlet port forming a part thereof.

8. An apparatus as defined in claim 4 in which a pressurizable space is defined between the interior of said protective containment vessel and the exterior of said boiling liquid jacket with a part being formed in said containment vessel to provide access to the interior of said pressurizable space.

* * * * *